(12) United States Patent
Liu et al.

(10) Patent No.: US 11,876,412 B2
(45) Date of Patent: Jan. 16, 2024

(54) SERVO MOTOR AND ROBOT HAVING SAME

(71) Applicant: Beijing Xiaomi Robot Technology Co., Ltd., Beijing (CN)

(72) Inventors: Yiyang Liu, Beijing (CN); Wenping Guo, Beijing (CN); Xiaomao Wei, Beijing (CN); Fang Zhi, Beijing (CN); Shuang Li, Beijing (CN)

(73) Assignee: BEIJING XIAOMI ROBOT TECHNOLOGY CO., LTD., Beijing (CN)

( * ) Notice: Subject to any disclaimer, the term of this patent is extended or adjusted under 35 U.S.C. 154(b) by 174 days.

(21) Appl. No.: 17/515,432

(22) Filed: Oct. 30, 2021

(65) Prior Publication Data

US 2022/0231581 A1    Jul. 21, 2022

(30) Foreign Application Priority Data

Jan. 15, 2021 (CN) .......................... 202120117218.0

(51) Int. Cl.
| | |
|---|---|
| H02K 7/08 | (2006.01) |
| H02K 11/215 | (2016.01) |
| B25J 9/12 | (2006.01) |
| H02K 7/116 | (2006.01) |

(52) U.S. Cl.
CPC ............ *H02K 11/215* (2016.01); *B25J 9/126* (2013.01); *H02K 7/085* (2013.01); *H02K 7/116* (2013.01); *H02K 2211/03* (2013.01)

(58) Field of Classification Search
CPC ...... H02K 11/215; H02K 7/085; H02K 7/116; H02K 2211/03; H02K 11/30; B25J 9/126; B25J 9/00; B62D 57/032
See application file for complete search history.

(56) References Cited

U.S. PATENT DOCUMENTS

| | | | | |
|---|---|---|---|---|
| 2020/0166961 | A1* | 5/2020 | Fang | .................... G05G 5/04 |
| 2020/0361101 | A1* | 11/2020 | Zhang | ............... B25J 19/0025 |

FOREIGN PATENT DOCUMENTS

| | | | | | |
|---|---|---|---|---|---|
| CN | 106476928 | A | * | 3/2017 | |
| CN | 111237399 | A | | 6/2020 | |
| CN | 210690968 | U | * | 6/2020 | ............... G02C 5/16 |
| CN | 111645772 | A | | 9/2020 | |
| WO | WO-2019098909 | A1 | * | 5/2019 | ......... H02K 11/0094 |
| WO | WO 2020175882 | A1 | | 9/2020 | |

OTHER PUBLICATIONS

WO2020175882A1 English translation (Year: 2023).*
CN106476928A English translation (Year: 2023).*
CN107651041A English translation (Year: 2023).*
CN210690968U English translation (Year: 2023).*
CN111237399A English translation (Year: 2023).*
CN111645772A English translation (Year: 2023).*
European Patent Application No. 21206598.1, extended Search and Opinion dated Apr. 21, 2022, 8 pages.

* cited by examiner

*Primary Examiner* — Christopher M Koehler
*Assistant Examiner* — Viswanathan Subramanian
(74) *Attorney, Agent, or Firm* — COZEN O'CONNOR

(57) ABSTRACT

A servo motor and a robot. The servo motor includes: a housing, a rotor, a stator, a Hall magnet, and one printed circuit board. The rotor is arranged in the housing and has a rotor support and a rotor shaft; the stator is arranged in the housing; the Hall magnet is arranged on the rotor; the printed circuit board is arranged in the housing and provided with a position sensor facing the Hall magnet.

17 Claims, 10 Drawing Sheets

SERVO MOTOR AND ROBOT HAVING SAME

CROSS-REFERENCE TO RELATED APPLICATION

The present disclosure is based on and claims priority to Chinese Patent Application No. 202120117218.0, filed Jan. 15, 2021, the entire contents of which are incorporated herein by reference.

FIELD

The present disclosure relates to the field of robot technologies, and in particular, to a servo motor and a robot having the servo motor.

BACKGROUND

Servo motors are commonly used drive devices for footed robots (also known as legged robots) and used to drive a leg assembly of the robot so that the footed robot can move. In order to improve control accuracy, it is required to detect the relative position of a stator and a rotor of a motor. Servo motors in related art have certain disadvantages due to their large size, low utilization of internal space, and low relative position detection accuracy.

SUMMARY

The servo motor according to embodiments of the present disclosure includes: a housing; a rotor arranged in the housing and having a rotor support and a rotor shaft; a stator arranged in the housing; a Hall magnet arranged on the rotor; and a printed circuit board arranged in the housing and provided with a position sensor facing the Hall magnet.

A robot according to embodiments of the present disclosure includes a body assembly; and a leg assembly rotatably connected to the body assembly, the leg assembly including a first leg, a second leg, a servo motor, an output flange and a transmission component. The servo motor includes a housing; a rotor arranged in the housing and having a rotor support and a rotor shaft; a stator arranged in the housing; a Hall magnet arranged on the rotor; and a printed circuit board arranged in the housing and provided with a position sensor facing the Hall magnet. The servo motor is arranged at a first end of the first leg, a motor output shaft of the servo motor is connected to the output flange to drive the output flange to rotate, the first leg is pivotally connected to the second leg, and the transmission component is connected to the output flange and the second leg to drive the second leg to rotate relative to the first leg.

DETAILED DESCRIPTION

Embodiments of the present disclosure are described in detail below and examples of the embodiments are shown in the accompanying drawings. The embodiments described below with reference to the drawings are exemplary, and are intended to explain the present disclosure, but should not be understood as a limitation on the present disclosure.

A servo motor and a robot having the servo motor according to embodiments of the present disclosure will be described below with reference to the accompanying drawings.

Figure 1:
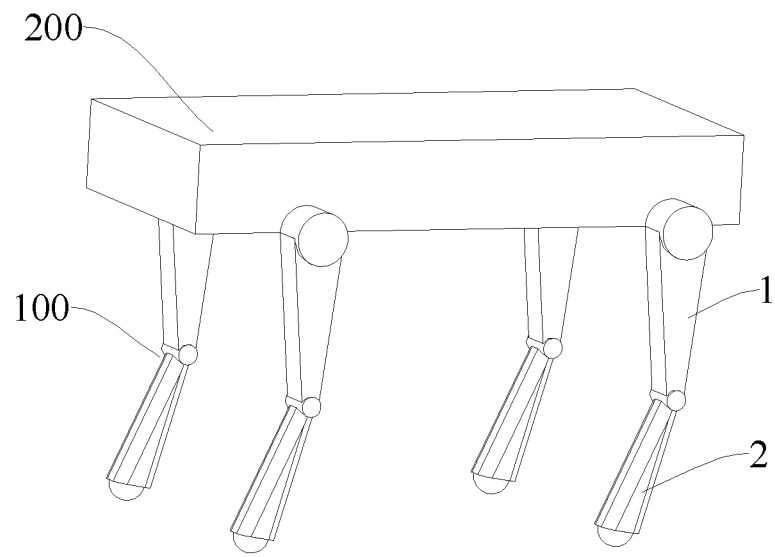
FIG. 1 is a schematic diagram of a robot according to an embodiment of the present disclosure.
Figure 2A:
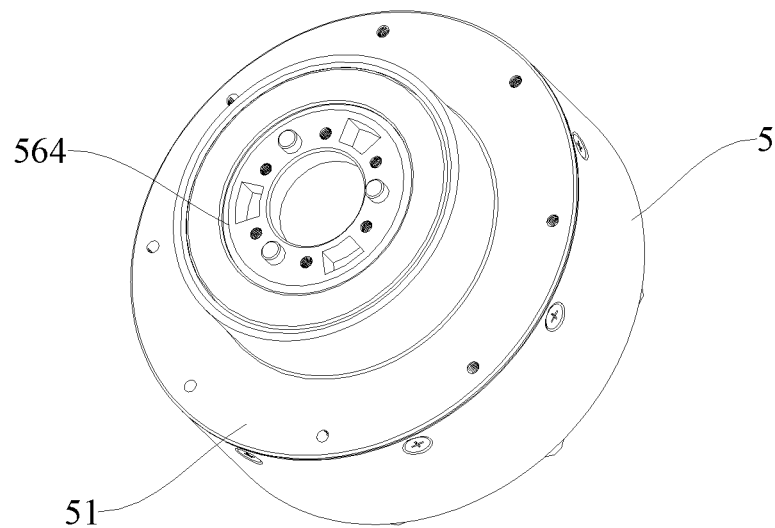
FIG. 2A is a schematic diagram of a servo motor according to an embodiment of the present disclosure.

First, the servo motor according to the embodiments of the present disclosure will be described with reference to the accompanying drawings. As illustrated in FIGS. 1 to 3, the servo motor 5 according to the embodiments of the present disclosure includes a housing 51, a rotor 52, a stator 53, a Hall magnet 54, and one printed circuit board 55. The rotor 52 is arranged in the housing 51 and has a rotor support 521 and a rotor shaft 522. The stator 53 is arranged in the housing 51, the Hall magnet 54 is arranged on the rotor 52, the printed circuit board 55 is arranged in the housing 51, and the printed circuit board 55 is provided with a position sensor 551 facing the Hall magnet 54.

In the servo motor according to embodiments of the present disclosure, the rotor 52 of the servo motor 5 drives the hall magnet 54 to rotate, and a rotation angle of the hall magnet 54 can be obtained by the position sensor 551 on the printed circuit board 55, to obtain a rotation angle of the rotor 52. Since the servo motor 5 only includes one printed circuit board 55, electronic components such as the position sensor 551 are integrated on the one printed circuit board, improving the utilization of space inside the servo motor 5, reducing the size of the servo motor 5, and contributing to the miniaturization of the motor.

The Hall magnet 54 may be arranged at an end of the rotor shaft 522 facing the position sensor 551. In at least one embodiment, the Hall magnet 54 may be arranged at a position on the rotor support 521 facing the position sensor 551.

In some embodiments, as illustrated in FIG. 3, the rotor support 521 is coaxially fitted over the rotor shaft 522, and the rotor support 521 and the rotor shaft 522 rotate together. The Hall magnet 54 is mounted on an end of the rotor support 521 close to the printed circuit board 55, and the Hall magnet 54 is arranged in a way of facing the position sensor 551.

S1 refers to a distance between the Hall magnet 54 and the position sensor 551, and 1 mm S1 3 mm. According to the research of the inventors, setting the distance S1 between the Hall magnet 54 and the position sensor 551 within the range of 1 mm to 3 mm can not only ensure the detection accuracy, but also improve the utilization of space inside the servo motor 5, to reduce the size of the servo motor 5. According to the experimental research of the inventors, if S1 is less than 1 mm, the detection accuracy is reduced; and if S1 is greater than 3 mm, the distance between the Hall magnet 54 and the position sensor 551 becomes too large, which increases the space required inside the servo motor.

In at least one embodiment, the printed circuit board 55 is arranged at a rear part in the housing 51; S2 refers to a minimum distance between the printed circuit board 55 and a rear end cover 511 of the housing 51, and 4 mm≤S2≤8 mm. Here, it should be understood that the minimum distance refers to a distance between the rear end cover and a part or element on the printed circuit board closest to the rear end cover. As illustrated in FIG. 3, the printed circuit board 55 is arranged between the rear end cover of the housing 51 and the rotor support 521, and the minimum distance between the printed circuit board 55 and the rear end cover of the housing 51 is S2. By setting the minimum distance S2 within the above range, the risk of collision with and damage to the electronic components on the printed circuit board 55 due to the deformation of the rear end cover 511 can be reduced and the overall size of the servo motor is reduced, which further facilitates the miniaturization of the servo motor 5; in the meanwhile, the space between the rear end cover 511 and the printed circuit board 55 can also serve as heat dissipation space, which is beneficial to the heat dissipation of the printed circuit board 55. If S2 is too small, the components on the printed circuit board 55 are prone to damage and heat dissipation is affected. If S2 is too large, it is adverse to the miniaturization of the servo motor.

In some embodiments, the electronic component arranged on the surface of the printed circuit board 55 facing the stator 53 generates less heat than the electronic component arranged on the surface of the printed circuit board 55 away from the stator 53. As illustrated in FIG. 3, the electronic component arranged on the upper end face of the printed circuit board 55 generates less heat than the electronic component arranged on the lower end face of the printed circuit board 55, so most of the heat can be led out toward the rear end cover 511, to avoid affecting the position sensor 551, improve the detection accuracy of the position sensor 551, and improve the overall heat dissipation performance of the servo motor.

In some embodiments, the servo motor 5 further includes a planetary reduction mechanism 56, and the planetary reduction mechanism 56 includes a sun gear 561, an inner gear ring 562, a planetary carrier 563, a motor output shaft 564, and a plurality of planetary gears 565. In the embodiment illustrated in FIG. 3, three planetary gears 565 are provided. The planetary gears 565 mesh with the sun gear 561 and the inner gear ring 562, and the sun gear 561 is coaxially connected with the rotor shaft 522. The planetary gears 565 are fitted over planetary shafts 566, and the planetary shafts 566 are connected to the planetary carrier 563 and the motor output shaft 564. When the servo motor 5 works, the rotor 52 drives the sun gear 561 to rotate, the sun gear 561 drives the planetary gears 565 and the planetary shafts 566 to rotate, and the planetary shafts 566 drive the planetary carrier 563 and the motor output shaft 564 to rotate.

Figure 4:
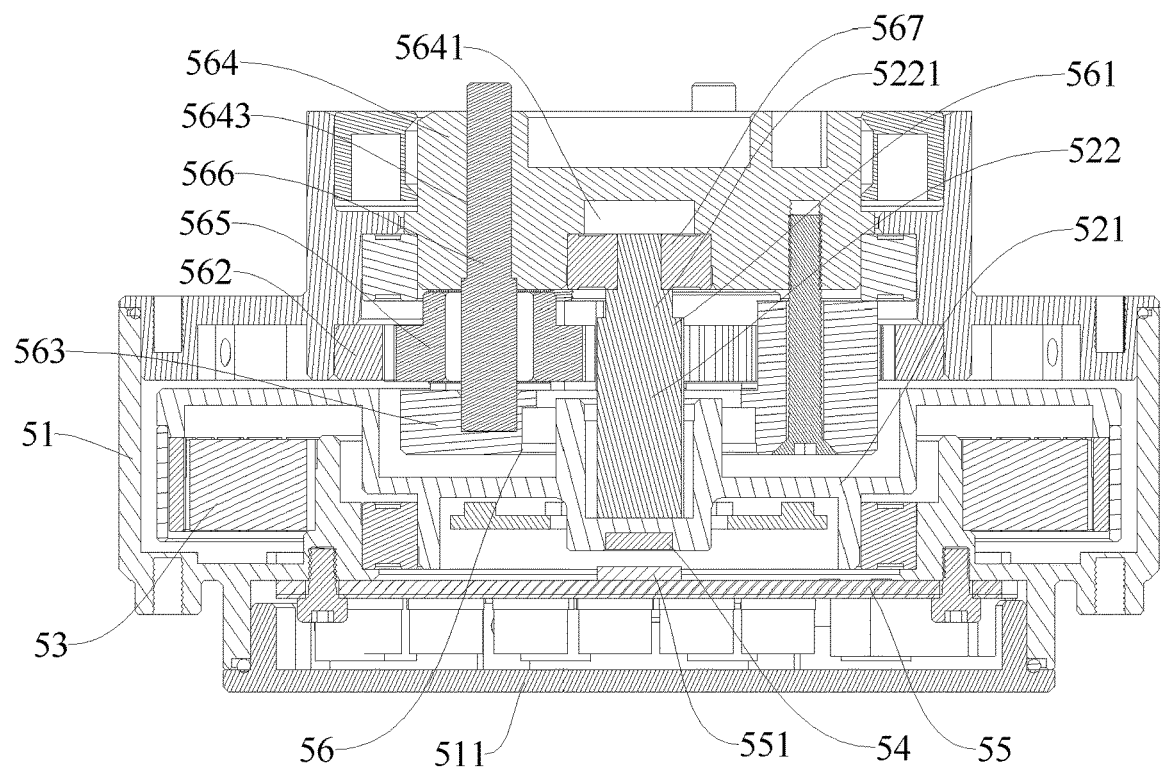
FIG. 4 is a cross-sectional view of a servo motor according to another embodiment of the present disclosure.
Figure 6:
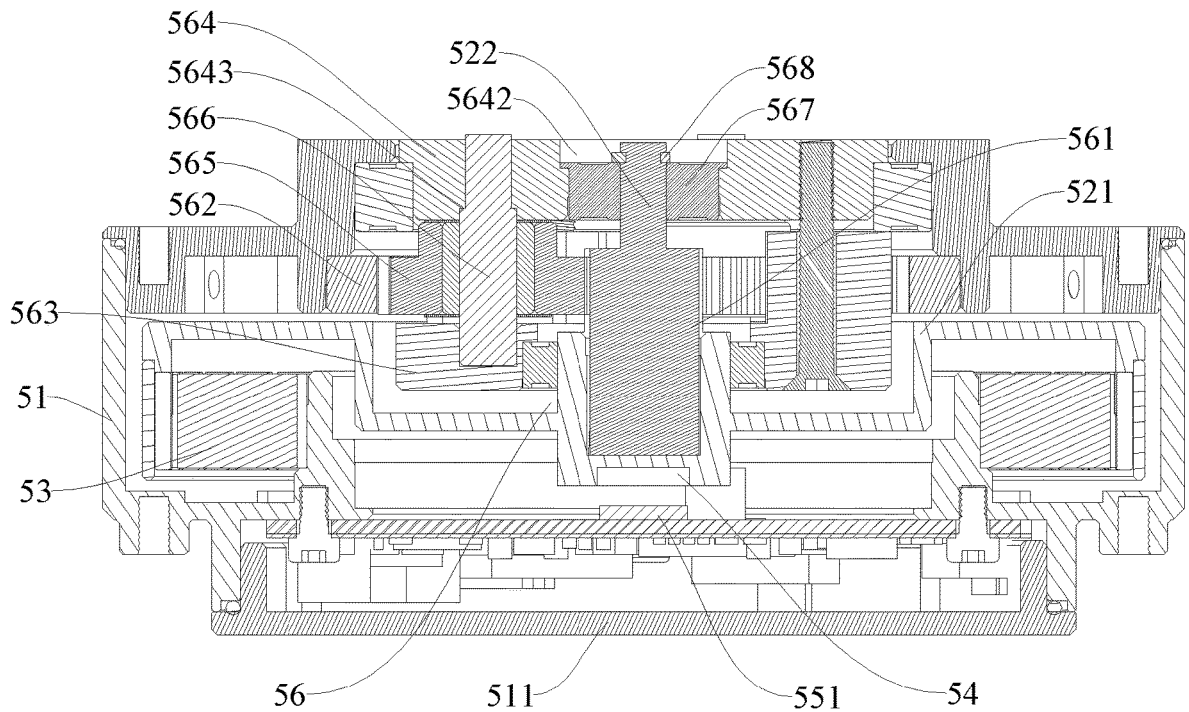
FIG. 6 is a cross-sectional view of a servo motor according to still another embodiment of the present disclosure.

In at least one embodiment, as illustrated in FIGS. 4 and 6, the rotor shaft 522 and the sun gear 561 are integrally formed. It can be understood that the rotor shaft 522 and the sun gear 561 are of a gear-shaft structure. In the servo motor 5 of the present disclosure, since the rotor shaft 522 and the sun gear 561 are made into an integral structure, the outer diameter of the sun gear 561 can be reduced while ensuring its strength, to reduce the size of the servo motor 5, facilitate the miniaturization design of the servo motor 5, and improve the applicability of the servo motor 5.

Figure 5:
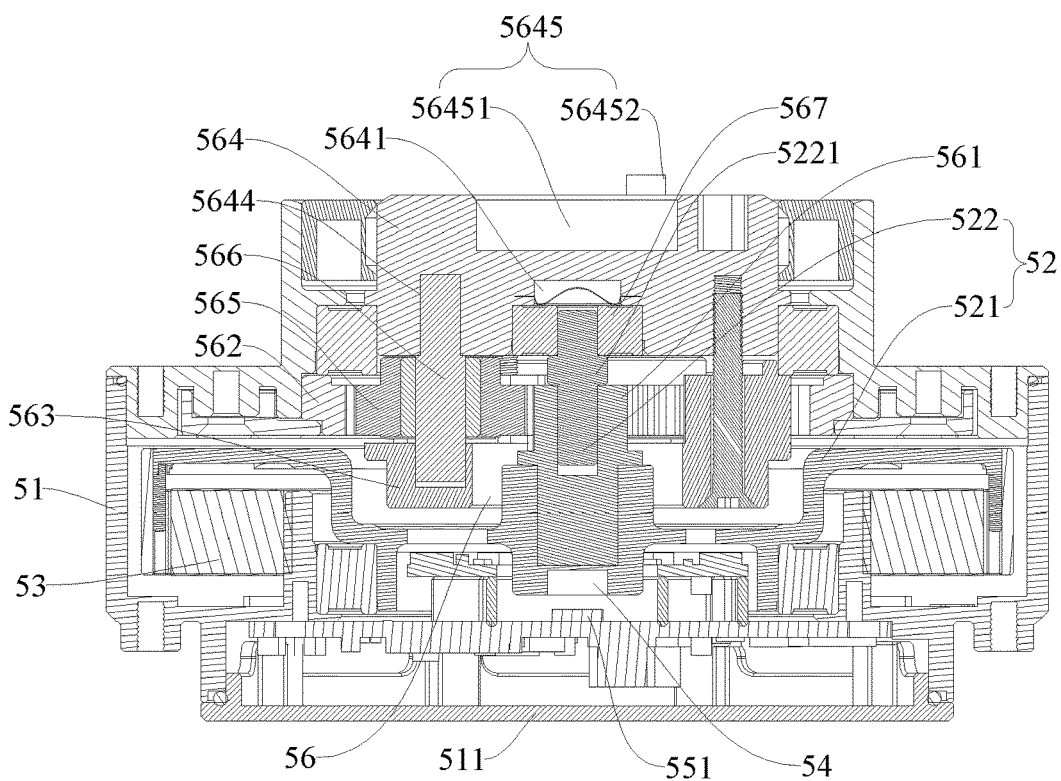
FIG. 5 is a cross-sectional view of a servo motor according to yet another embodiment of the present disclosure.

In some embodiments, as illustrated in FIGS. 3 to 5, the planetary reduction mechanism 56 further includes a rotor bearing 567; an end of the motor output shaft 564 (e.g., a lower end of the motor output shaft 564 in FIG. 3) is provided with a bearing mounting groove 5641, the rotor shaft 522 is provided with a flange 5221, the rotor bearing 567 is fitted over the rotor shaft 522, an end of the rotor bearing 567 (e.g., a lower end of the rotor bearing 567 in FIG. 3) abuts against the flange 5221, and the other end of the rotor bearing 567 (e.g., an upper end of the rotor bearing 567 in FIG. 3) abuts against an inner wall of the bearing mounting groove 5641. It can be understood that since an inner ring of the rotor bearing 567 abuts against the flange 5221, the rotor bearing 567 can be axially positioned; since an outer ring of the rotor bearing 567 abuts against the inner wall of the bearing mounting groove 5641, the rotor bearing 567 can be further positioned radially, to improve the positioning accuracy of the rotor bearing 567. In addition, since the bearing mounting groove 5641 does not penetrate through the motor output shaft 564, the possibility of external dust or sewage entering the servo motor 5 can be reduced to a certain extent, and the waterproof performance of the servo motor 5 is improved.

In at least one embodiment, as illustrated in FIGS. 3 and 5, the rotor shaft 522 and the sun gear 561 are detachably connected, and the sun gear 561 abuts against the flange 5221. It can be understood that the rotor shaft 522 is in an interference fit with the sun gear 561, and an upper end of the sun gear 561 abuts against the flange 5221 to position the sun gear 561 in both axial and radial directions and facilitate the assembly and disassembly of the servo motor 5.

In other embodiments, as illustrated in FIG. 6, the planetary reduction mechanism 56 further includes a rotor bearing 567, a bearing mounting hole 5642 is defined in the motor output shaft 564, the rotor bearing 567 is fitted in the bearing mounting hole 5642, and an end of the rotor shaft 522 (e.g., an upper end of the rotor shaft 522 in FIG. 6) protrudes from the rotor bearing 567 and is engaged by a circlip 568. It can be understood that the bearing mounting hole 5642 penetrates through the motor output shaft 564 along the axial direction of the motor output shaft 564. The bearing mounting hole 5642 is configured as a stepped hole. The outer ring of the rotor bearing 567 abuts against the bearing mounting hole 5642 and is in an interference fit with the bearing mounting hole 5642. The rotor shaft 522 is in an interference fit with the rotor bearing 567, and the upper end of the rotor shaft 522 protrudes upward from the inner ring of the rotor bearing 567. The upper end of the rotor shaft 522 has a snap groove in which the circlip 568 is engaged for positioning the rotor shaft 522, avoiding axial displacement between the rotor shaft 522 and the rotor bearing 567.

In some embodiments, as illustrated in FIGS. 3, 4 and 6, a plurality of fitting holes 5643 penetrate through the motor output shaft 564, the plurality of fitting holes 5643 are in one-to-one correspondence with the plurality of planetary shafts 566, and ends of at least part of the planetary shafts 566 protrude from the fitting holes 5643. For example, three planetary shafts 566 and three fitting holes 5643 are provided. The three planetary shafts 566 are spaced apart along the circumferential direction of the sun gear 561, and the upper ends of the three planetary shafts 566 respectively protrude through the three fitting holes 5643. It can be understood that the portion of the planetary shaft 566 protruding through the fitting hole 5643 constitutes a positioning portion 5645 to perform positioning when other components are assembled with the servo motor 5, thus improving the assembly efficiency.

In other embodiments, as illustrated in FIG. 5, an end of the motor output shaft 564 (e.g., a lower end of the motor output shaft 564 in FIG. 5) is provided with a plurality of fitting grooves 5644, the plurality of fitting grooves 5644 are in one-to-one correspondence with the plurality of planetary shafts 566, and an end of the planetary shaft 566 (e.g., an upper end of the planetary shaft 566 in FIG. 5) is fitted in the fitting groove 5644. For example, three planetary shafts 566 and three fitting grooves 5644 are provided. The three planetary shafts 566 are spaced apart along a circumferential direction of the sun gear 561. The upper ends of the three planetary shafts 566 are respectively mounted in the three fitting grooves 5644. It is understood that since the fitting grooves 5644 do not penetrate through the motor output shaft 564, the possibility of external dust or sewage entering the servo motor 5 can be reduced to a certain extent, to improve the waterproof performance of the servo motor 5. In at least one embodiment, the planetary shafts 566 are in clearance fit with the fitting grooves 5644 to facilitate the assembly of the planetary shafts 566 and the motor output shaft 564.

Figure 2B:
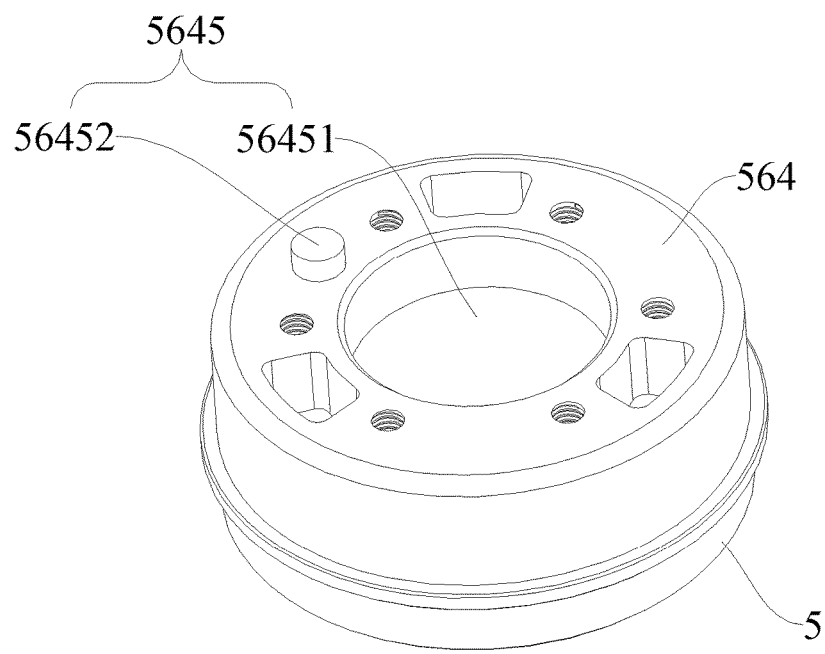
FIG. 2B is a schematic diagram of a servo motor according to another embodiment of the present disclosure.
Figure 3:
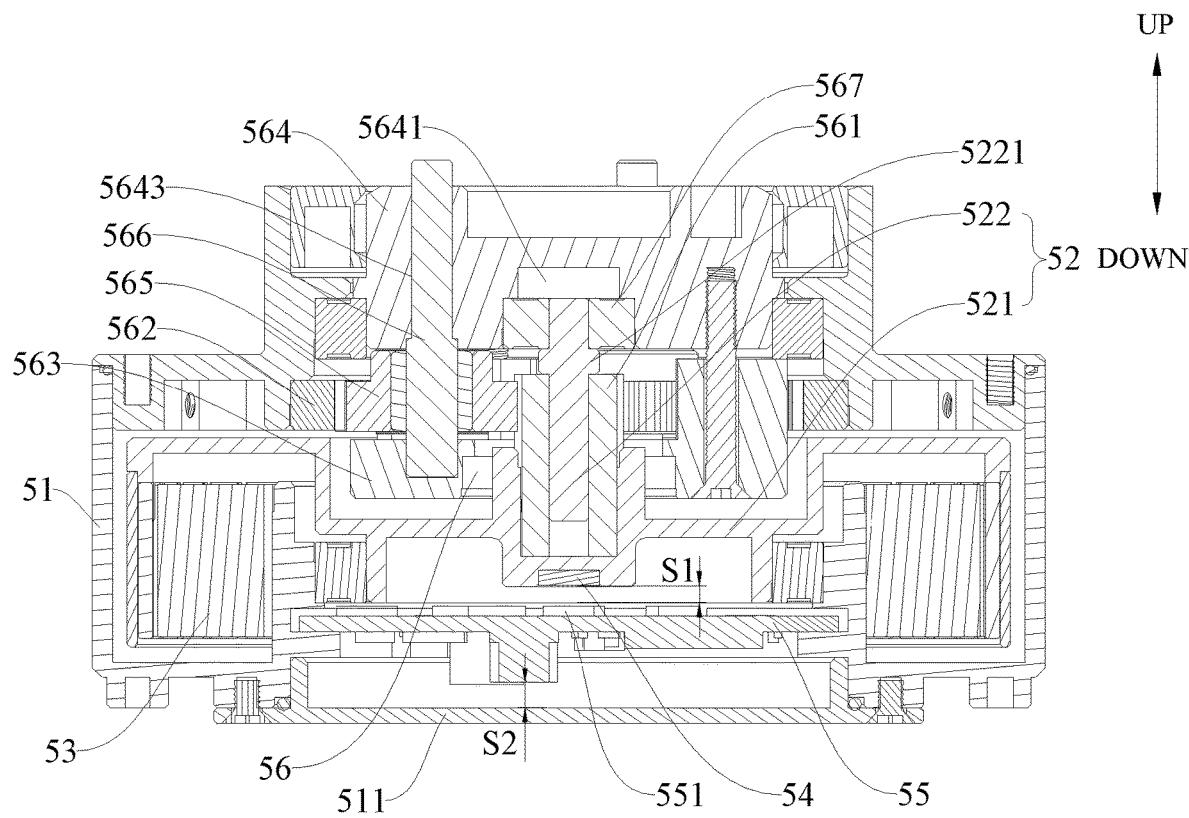
FIG. 3 is a cross-sectional view of a servo motor according to an embodiment of the present disclosure.

Further, as illustrated in FIGS. 2B and 5, the other end of the motor output shaft 564 (e.g., the upper end of the motor output shaft 564 in FIG. 5) is provided with a positioning portion 5645. The positioning portion 5645 includes a first positioning portion 56451 and a second positioning portion 56452. The first positioning portion 56451 and the second positioning portion 56452 are spaced apart in the radial direction of the motor output shaft 564, and the first positioning portion 56451 is arranged coaxially with the motor output shaft 564. For example, the first positioning portion 56451 is configured as a positioning groove, and the second positioning portion 56452 is configured as a positioning post. It can be understood that when the motor output shaft 564 of the servo motor 5 is assembled with other components, the components can be positioned radially and axially through the first positioning portion 56451 and the second positioning portion 56452, improving assembly efficiency.

A robot according to embodiments of the present disclosure will be described below with reference to the accompanying drawings.

As illustrated in FIG. 1, the robot according to embodiments of the present disclosure includes a body assembly 200 and a plurality of leg assemblies 100. In the embodiment illustrated in FIG. 1, four leg assemblies 100 are provided. Therefore, the robot can be called a four-footed robot or a four-legged robot. It can be understood that the present disclosure is not limited to this. For example, the robot may also include two leg assemblies 100, and accordingly the robot may be called a two-footed robot or a two-legged robot. In the embodiment illustrated in FIG. 1, the four leg assemblies 100 are connected to the body assembly 200 to support the body assembly 200. When the leg assembly 100 works, the robot's walking and other actions can be realized.

As illustrated in FIGS. 1 to 14, the leg assembly 100 includes a first leg 1, a second leg 2, a servo motor 5, an output flange 4 and a transmission component 3. It can be understood that the first leg 1 can also be referred to as a thigh, and the second leg 2 can also be referred to as a calf. The first leg 1 may be pivotally connected to the body assembly 200 of the robot.

Figure 8:
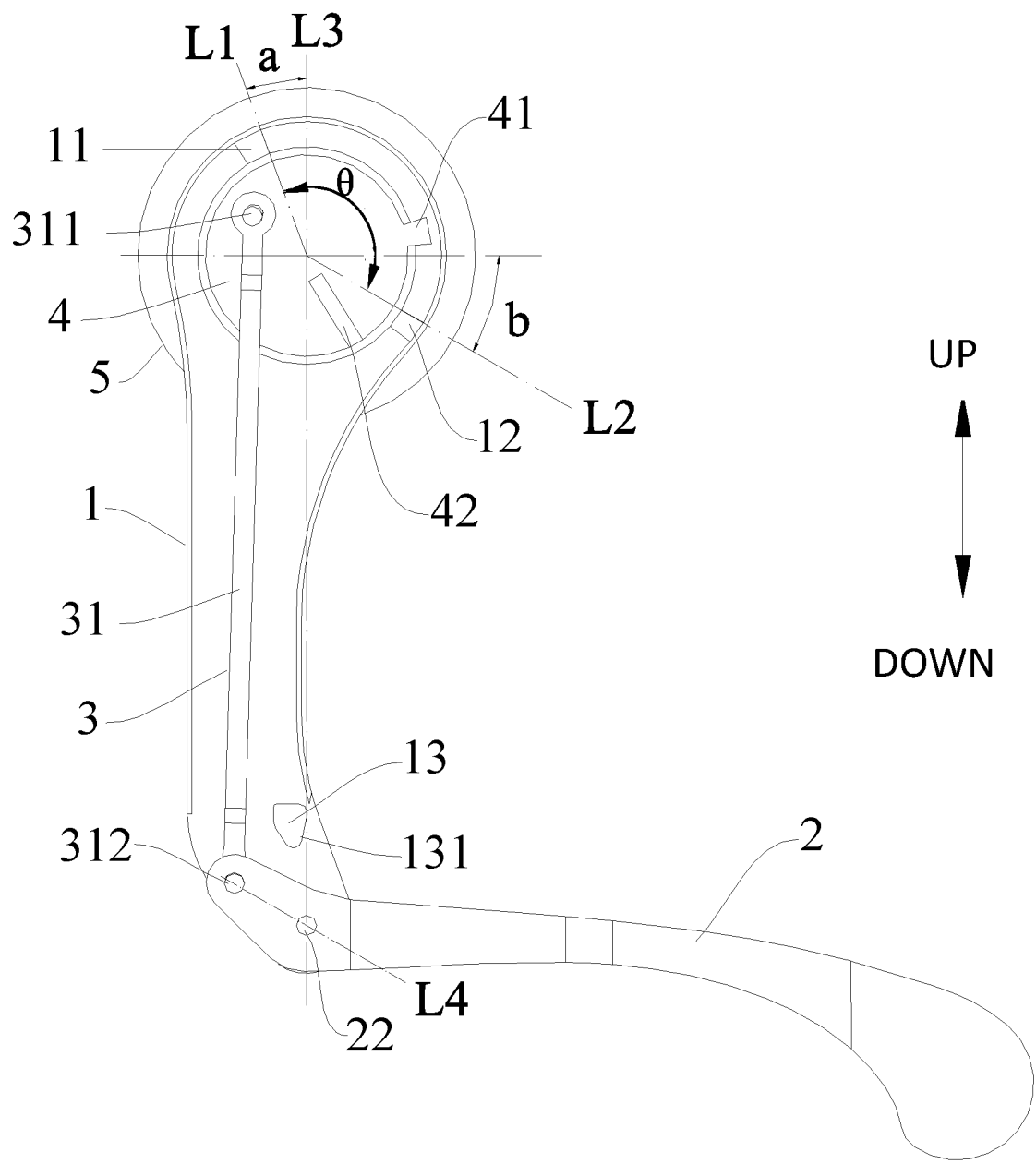
FIG. 8 is a schematic diagram of a leg assembly of a robot according to an embodiment of the present disclosure.

The servo motor 5 is arranged at a first end of the first leg 1 (e.g., an upper end of the first leg 8 in FIG. 8). The motor output shaft 564 of the servo motor 5 is connected to the output flange 4 to drive the output flange 4 to rotate. The leg 1 and the second leg 2 are pivotally connected, and the transmission component 3 is connected with the output flange 4 and the second leg 2 to drive the second leg 2 to rotate relative to the first leg 1.

As illustrated in FIGS. 7 to 10, the output flange 4 is provided with a first limit portion 41. The first leg 1 is provided with a first stop portion 11 and a second stop portion 12, and the first stop portion 11 and the second stop portion 12 are spaced apart along a circumferential direction of the output flange 4. The first stop portion 11 and the second stop portion 12 can limit a rotation angle of the output flange 4 by stopping the first limit portion 41, to limit a rotation range of the second leg 2 relative to the first leg 1 and an unfolding limit position and folding limit position of the second leg 2.

In other words, the first stop portion 11 and the second stop portion 12 respectively define rotation limit positions of the first limit portion 41. When the first limit portion 41 is stopped by the first stop portion 11 or the second stop portion 12, further rotation of the output flange 4 is stopped, that is, further rotation of the servo motor 5 is stopped.

Figure 9:
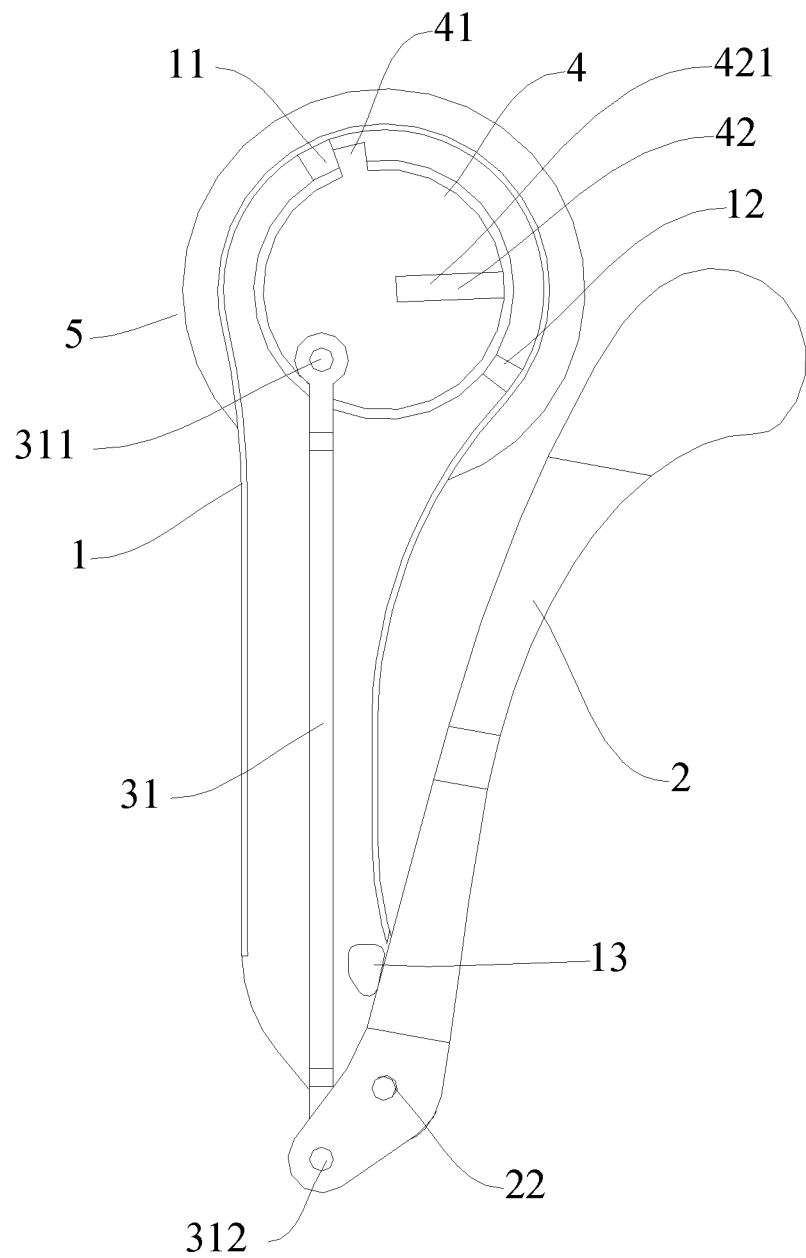
FIG. 9 is a schematic diagram of a leg assembly of a robot according to an embodiment of the present disclosure, where a second leg is in a folding limit position.
Figure 10:
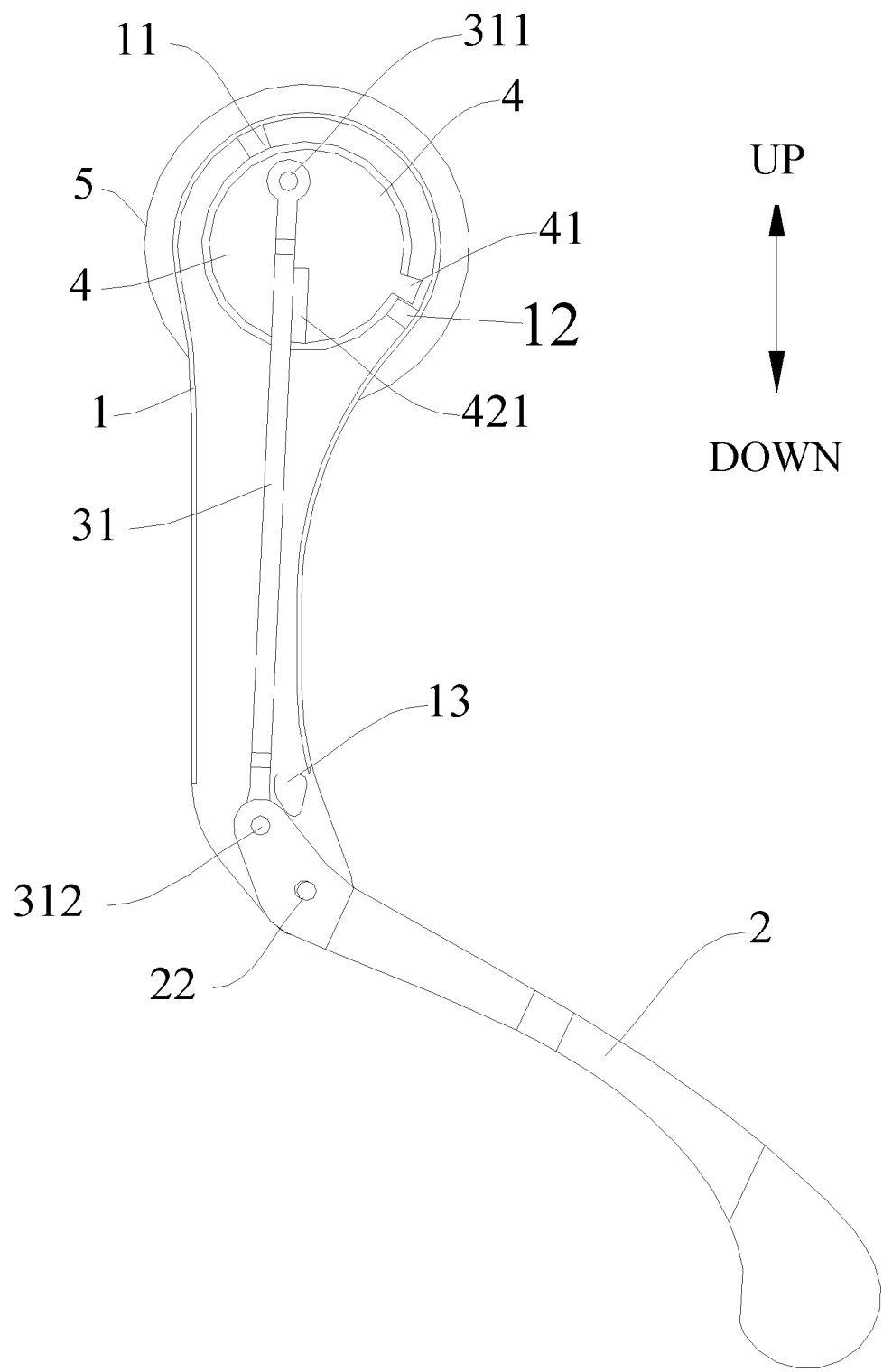
FIG. 10 is a schematic diagram of a leg assembly of a robot according to an embodiment of the present disclosure, where a second leg is in an unfolding limit position.

For example, as illustrated in FIGS. 8 to 10, when the output flange 4 rotates clockwise from a position illustrated in FIG. 8, after the first limit portion 41 comes into contact with the second stop portion 12 on the first leg 1, the second stop portion 10 stops the output flange 4 from further rotating clockwise, as illustrated in FIG. 10, that is, the output flange 4 reaches a clockwise rotation limit position, so that the second leg 2 rotates to the unfolding limit position. Conversely, when the output flange 4 rotates counterclockwise from a position illustrated in FIG. 8, after the first limit portion 41 comes into contact with the first stop portion 11 on the first leg 1, the first stop portion 9 stops the output flange 4 from further rotating counterclockwise, as illustrated in FIG. 9, that is, the output flange 4 reaches a counterclockwise rotation limit position, so that the second leg 2 rotates to the folding limit position.

A second limit portion 13 is arranged on the first leg 1 and configured to stop the second leg 2 to limit the rotation of the second leg 2. As illustrated in FIG. 9, when the second leg 2 moves to the folding limit position, the second limit portion 13 stops the second leg 2, and at the same time, the first stop portion 11 stops the first limit portion 41.

In the robot according to embodiments of the present disclosure, by arranging the first stop portion 11 and the second stop portion 12 on the first leg 1, the rotation angle range of the output flange 4 can be conveniently limited, facilitating the control over the rotation range of the second leg 2, i.e., the unfolding limit position and the closing limit position, and further accurately controlling the operation of the second leg 2. Moreover, since the second limit portion 13 is arranged on the first leg 1, when the first limit portion 41 is stopped by the first stop portion 11, the second leg 2 that moves to the folding limit position is stopped by the second limit portion 13, preventing the second leg 2 from colliding with the first leg 1. As a result, the rotation of the output flange 4 can be conveniently limited within a predetermined angle range, and at the same time, the second leg 2 that moves to the folding limit position is limited by the second limit portion 13, improving the limit reliability of the leg assembly 100; moreover, stress and impact on various members of the leg assembly 100 are reduced, which reduces noise and facilitates accurate control of the leg assembly 100.

As illustrated in FIGS. 8 to 10, the output flange 4 is configured as a disc and coaxially connected with the motor output shaft of the servo motor 5. The first limit portion 41 is arranged on an outer peripheral wall of the output flange 4, and the first stop portion 11 and the second stop portion 12 are arranged at the upper end of the first leg 1 along the circumferential direction of the output flange 4.

In the embodiments illustrated in FIGS. 8 to 10, the first limit portion 41, the first stop portion 11 and the second stop portion 12 are all rectangular blocks, so that the first limit portion 41 is in surface contact with the first stop portion 11 and the second stop portion 12, thus achieving more even stress and smaller impact. In at least one embodiment, a surface of the first stop portion 11 and a surface of the second stop portion 12 and/or a surface of the first limit portion 41 are covered with a buffer layer, such as an elastic rubber layer, to further reduce the impact when the first limit portion 41 comes into contact with the first stop portion 11 and the second stop portion 12. Further in at least one embodiment, tapered grooves may be defined in the surfaces of the first stop portion 11 and the second stop portion 12 in contact with the first limit portion 41, and the first limit portion 41 is provided with a tapered protrusion. In this way, when the first limit portion 41 comes into contact with the first stop portion 11 or the second stop portion 12, the tapered protrusion gradually enters the tapered groove, further increasing the smoothness of the contact and reducing the impact. More advantageously, a surface of the tapered groove and/or a surface of the tapered protrusion may be covered with an elastic material layer to further reduce the impact.

Figure 14:
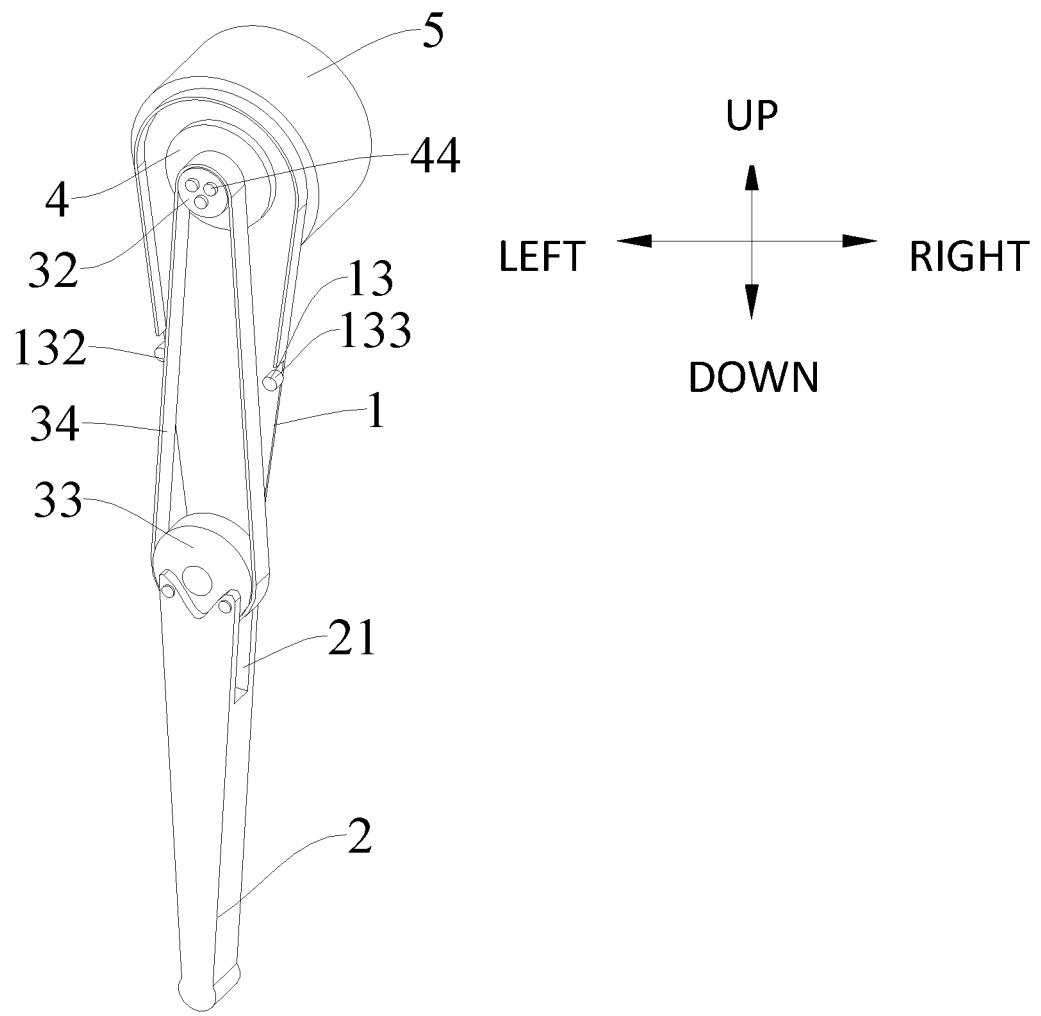
FIG. 14 is a schematic diagram of a leg assembly of a robot according to yet another embodiment of the present disclosure.

In some embodiments, as illustrated in FIGS. 8 to 10, the second limit portion 13 is configured as a limit block suitable for surface contact with the second leg 2. In at least one embodiment, the second limit portion 13 may also be configured as a limit post suitable for line contact with the second leg 2, as illustrated in FIG. 14.

In some embodiments, the second limit portion 13 is configured as a limit block suitable for surface contact with the second leg 2, which can further reduce the stress and impact on the leg assembly 100 and increase the service life of the leg assembly 100.

In some embodiments, as illustrated in FIG. 9, the second limit portion 13 can limit the counterclockwise rotation of the second leg 2 and the height of the leg assembly 100 is further limited when the robot stands up, improving the applicability of the leg assembly 100 and facilitating the design of the robot.

In some embodiments, as illustrated in FIGS. 8 to 10, a third limit portion 42 is arranged on the output flange 4 and configured to stop the transmission component 3 to limit the rotation of the second leg 2.

In at least one embodiment, as illustrated in FIGS. 9 and 10, the third limit portion 42 is configured as a protrusion 421 arranged on the surface of the output flange 4. As illustrated in FIG. 10, when the output flange 4 rotates clockwise and the second leg 2 rotates clockwise to the unfolding limit position, the transmission component 3 comes into contact with the third limit portion 42 to stop the movement of the transmission component 3, further limiting the rotation of the output flange 4, the servo motor 5 and the second leg 2; the protrusion 421 rotates clockwise together with the output flange 4 and stops the transmission component 3 and the movement of the second leg 2 is further limited, further improving the limit reliability of the leg assembly 100. Therefore, when the second leg 2 moves to the unfolding limit position and the folding limit position, double limit is always realized, which improves the limit reliability.

In some embodiments, as illustrated in FIGS. 7 to 10, the transmission component 3 includes a connecting rod 31, a first end of the connecting rod 31 (e.g., an upper end of the connecting rod 31 in FIG. 8) is pivotally connected to the output flange 4 by a first pivot 3111, a second end of the connecting rod 31 (e.g., a lower end of the connecting rod 31 in FIG. 8) is pivotally connected to a first end of the second leg 2 (e.g., a left end of the second leg 2 in FIG. 8) by a second pivot 312, and a second end of the first leg 1 (e.g., a lower end of the first leg 1 in FIG. 8) and the first end of the second leg 2 are pivotally connected by a third pivot 22.

After the servo motor 5 is started, the output flange 4 is driven to rotate, for example, swing, around a center axis of the motor output shaft 564 through the motor output shaft 564 of the servo motor 5. Since the first pivot 311 is eccentrically arranged with respect to the center axis of the motor output shaft 564, the first pivot 311 revolves around the central axis of the motor output shaft 564, and then the first end of the connecting rod 3 is driven to revolve around the central axis of the motor output shaft 564, thus driving the connecting rod 3 to move. Since the second end of the connecting rod 3 is pivotally connected to the first end of the second leg 2 through the second pivot and the first end of the second leg 2 is pivotally connected through the third pivot 22, the connecting rod 3 drives the second leg 2 to rotate around the third pivot 22 relative to the first leg 1.

In some embodiments, in FIG. 8, the third pivot 22 is located between the second pivot 312 and a second end of the second leg 2, that is, the third pivot 22 is closer to the second end (a right end in FIG. 8) of the second leg 2 than the second pivot 312. When the output flange 4 rotates clockwise, the connecting rod 3 moves upward and drives the second pivot 312 to move upward, and then the second leg 2 is driven to swing clockwise around the third pivot 22, thus unfolding the second leg 2 relative to the first leg 1. Conversely, when the output flange 4 rotates counterclockwise, the connecting rod 3 moves downward and drives the second pivot 312 to move downward, and then the second leg 2 is driven to swing counterclockwise around the third pivot 22, thus folding the second leg 2 up relative to the first leg 1.

Alternatively, the second pivot 312 may also be located between the third pivot 22 and the second end of the second leg 2, that is, the second pivot 312 is closer to the second end (the right end in FIG. 8) of the second leg 2 than the third pivot 22. In this way, when the output flange 4 rotates clockwise, the second leg 2 is driven to fold up relative to the first leg 1; and when the output flange 4 rotates counterclockwise, the second leg 2 is driven to unfold relative to the first leg 1.

Figure 13:
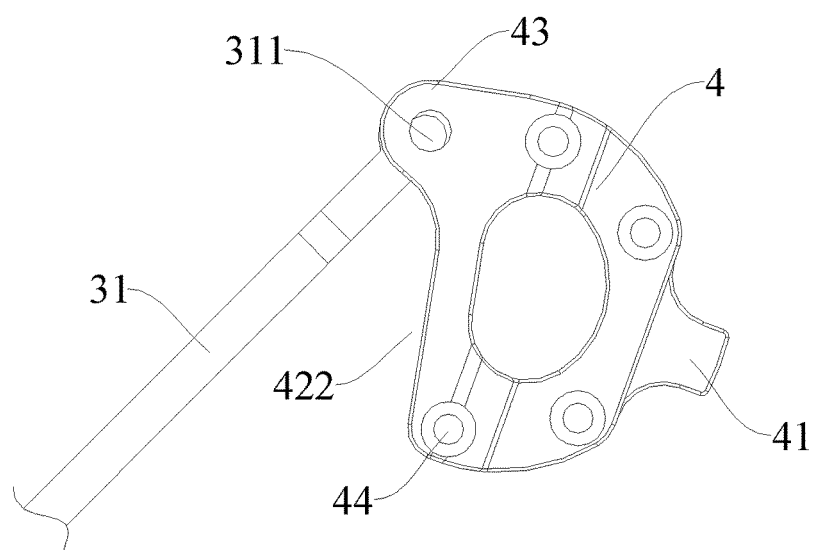
FIG. 13 is a schematic diagram of connection between an output flange and a connecting rod in a leg assembly of a robot according to another embodiment of the present disclosure.

In some embodiments, as illustrated in FIG. 13, the output flange 4 is provided with a recessed portion 422, an end of the recessed portion 422 is provided with a U-shaped fitting groove 43, the first end of the connecting rod 31 is pivotally fitted in the U-shaped fitting groove 43, and a surface of the recessed portion 422 constitutes a third limit portion 42. As illustrated in FIG. 13, when the connecting rod 31 moves, a side wall of the connecting rod 31 can abut against a surface of the recessed portion 422, to limit the rotation of the connecting rod 31, and further limit the rotation of the output flange 4, the servo motor 5 and the second leg 2; in this way, the limit reliability can be improved, the stress and impact on various members can be reduced, and the movement of the second leg 2 can be accurately controlled.

Figure 11:
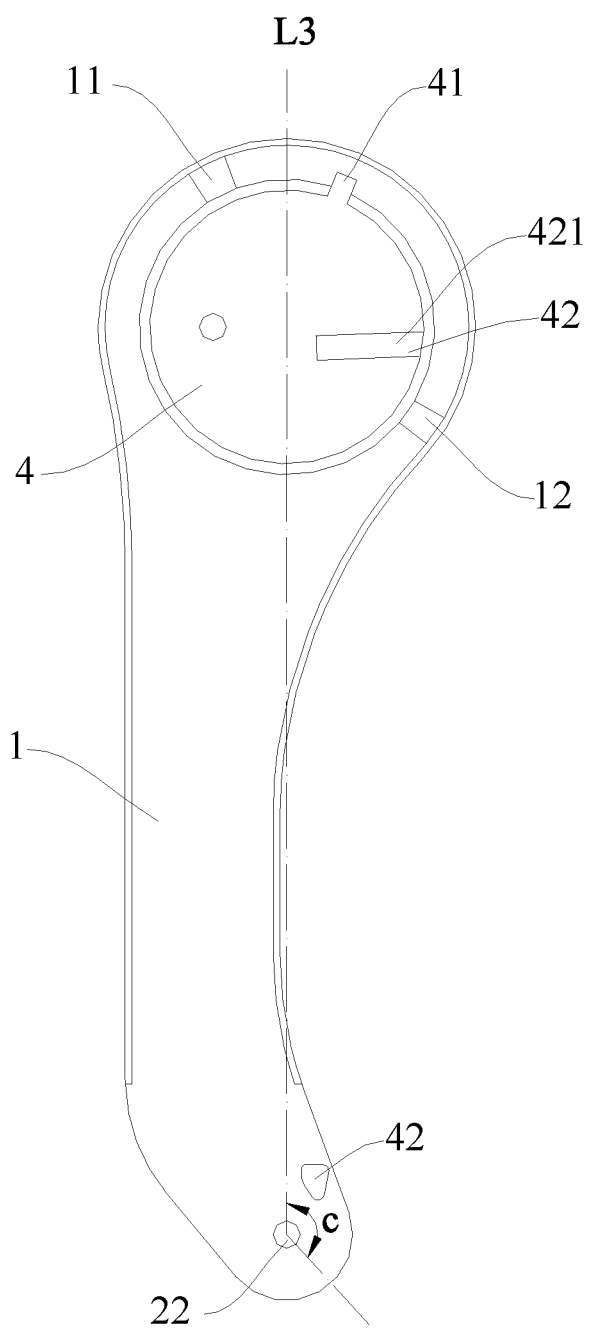
FIG. 11 is a schematic diagram of a first leg and an output flange of a leg assembly of a robot according to an embodiment of the present disclosure.
Figure 12:
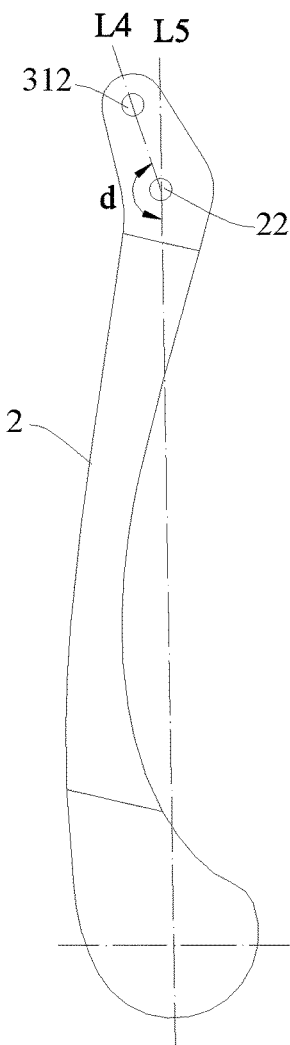
FIG. 12 is a schematic diagram of a second leg of a leg assembly of a robot according to an embodiment of the present disclosure.

Further, as illustrated in FIGS. 8, 11 and 12, L1 refers to a first connecting line between the first stop portion 11 and a center of the motor output shaft 564, L2 refers to a second connecting line between the second stop portion 12 and the center of the motor output shaft 564, and θ refers to an angle between L1 and L2, where 110 degrees≤θ≤160 degrees. In other words, L1 refers to a connecting line between the center of the output flange 4 and a contact surface of the first stop portion 11 for contact with the first limit portion 41, and L2 refers to a connecting line between the center of the output flange 4 and a contact surface of the second stop portion 12 for contact with the first limit portion 41. According to the research of the inventors of the present disclosure, by setting a swing angle of the first limit portion 41 between 110 degrees and 160 degrees, the stress and impact on the leg assembly can be further reduced, and the rotation of the second leg 2 is more stable.

In some embodiments, as illustrated in FIGS. 8, 11 and 12, a refers to an angle between the first connecting line L1 and a third connecting line L3 (between the center of the third pivot 22 and the center of the motor output shaft 564), and 0 a 40 degrees. b refers to an angle between the second connecting line L2 and a direction perpendicular to the third connecting line L3, and 10 degrees≤b≤50 degrees.

As illustrated in FIG. 8, the sum of the angle a between the first connecting line L1 and the third connecting line L3 (between the center of the third pivot 22 and the center of the motor output shaft 564) and the angle b between the second connecting line L2 and the direction perpendicular to the third connecting line L3 plus 90 degrees is equal to the angle θ between the first connecting line L1 (between the first stop portion 11 and the center of the motor output shaft 564) and the second connecting line L2 (between the second stop portion 12 and the center of the motor output shaft 564). According to the research of the inventors of the present disclosure, by limiting the angle a and the angle b within the above ranges, the stress on various members can be further reduced, the impact is smaller, the operation is more stable, and the operation of the second leg 2 can be controlled more accurately.

In some embodiments, as illustrated in FIGS. 8, 11 and 12, c refers to an angle between a length direction of the second end of the first leg 1 and the third connecting line L3, and 130 degrees≤c≤170 degrees. Further, d refers to an angle between a fourth connecting line L4 (between a center of the second pivot 312 and a center of the third pivot 22) and a fifth connecting line L5 (between the center of the third pivot 22 and the center of the second end (e.g., a lower end of the second leg 2 in FIG. 12) of the second leg 2), and 140 degrees≤d≤180 degrees.

According to the research of the inventors of the present disclosure, by setting the angle c in the first leg 1 and/or the angle d in the second leg 2 as above, the movement ranges of the first leg and the second leg are relatively wide, their degrees of freedom are good used, interference is avoided, and the first leg 1, the second leg 2 and the connecting rod 3 can move stably.

Further, as illustrated in FIG. 8, a distance between the center of the first pivot 3111 and the center of the motor output shaft is less than a distance between the center of the second pivot 312 and the center of the third pivot 22. Based on this design, a swing path of the second leg 2 can be controlled more conveniently, the movement performance of the second leg can be improved, and the movement characteristics of the leg assembly and the robot can be controlled more accurately.

In some embodiments, as illustrated in FIG. 14, the transmission component 3 includes a first wheel 32, a second wheel 33, and a flexible transmission member 34 wound on the first wheel 32 and the second wheel 33. The first wheel 32 is mounted on the output flange 4, the second wheel 33 is rotatably mounted on the second end of the first leg 1, and the first end of the second leg 2 is connected to the second wheel 33.

As illustrated in FIG. 14, the first wheel 32 and the second wheel 33 are configured as pulleys and the flexible transmission member 34 is configured as a transmission belt. In at least one embodiment, the first wheel 32 and the second wheel 33 may be configured as sprockets, and the flexible transmission member 34 may be configured as a chain. The servo motor 5 can drive the first wheel 32 to rotate, the first wheel 32 drives the second wheel 33 to rotate through the flexible transmission member 34, and the second wheel 33 can drive the second leg 2 to rotate.

Further, as illustrated in FIG. 14, the second limit portion 13 includes a left second limit portion 132 and a right second limit portion 133 spaced apart along a width direction of the first leg 1 (e.g., a left-right direction of the first leg 1 in FIG. 14); and the left second limit portion 132 and the right second limit portion 133 are configured to limit the rotation angle of the second leg 2. In some embodiments, the flexible transmission member 34 is located between the left second limit portion 132 and the right second limit portion 133, and the left second limit portion 132 and the right second limit portion 133 are symmetrically arranged relative to a length direction of the first leg 1.

In some embodiments, as illustrated in FIG. 14, the first end of the second leg 2 is provided with a U-shaped groove 21, and a part of the second wheel 33 is located in the U-shaped groove 21. It can be understood that the second wheel 33 is mounted at an upper end of the second leg 2, and the upper end of the second leg 2 is connected with the second wheel 33 by bolts or rivets, so that the second wheel 33 can drive the second leg 2 to rotate.

Figure 7:
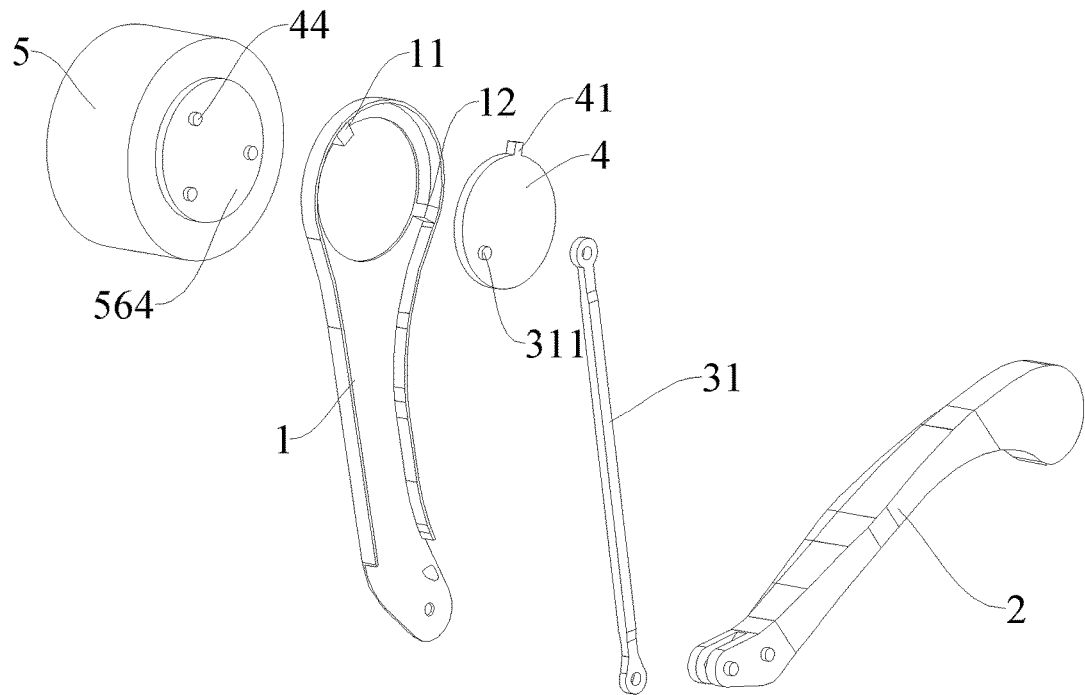
FIG. 7 is an exploded view of a leg assembly of a robot according to an embodiment of the present disclosure.

As illustrated in FIGS. 2A, 2B and 7, the output flange 4 is connected to the motor output shaft 564 through a plurality of pin shafts 44. For example, three pin shafts 44 are provided, and the output flange 4 is fixed to the motor output shaft 564 through the three pin shafts 44, improving the connection strength between the output flange 4 and the motor output shaft 564.

As illustrated in FIG. 1, the robot according to embodiments of the present disclosure has four leg assemblies 100, and the four leg assemblies 100 are connected to the body assembly 200. The first leg 1 of the leg assembly 100 can be driven by another servo motor to rotate relative to the body assembly 200, and the servo motor 5 drives the second leg 2 to rotate relative to the first leg 1, thus realizing the walking and other actions of the robot. In the robot according to embodiments of the present disclosure, the limit reliability of the leg assembly 100 is high, the stress on various members is small, the impact is small, the noise is low, the operation is stable, and the control accuracy is high.

In the description of the present disclosure, it should be understood that the orientations or positional relationships, indicated by the terms "central", "longitudinal", "lateral", "length", "width", "thickness", "on", "under", "front", "rear", "left", "right", "vertical", "horizontal", "top", "bottom", "inside", "outside", "clockwise", "counterclockwise", "axial", "radial", "circumferential", and the like, are based on the orientations or positional relationships shown in the drawings and are only for the purpose of facilitating and simplifying the description of the present disclosure, rather than indicating or implying that the described device or element must have a particular orientation or must be constructed and operated in a particular orientation, and therefore they cannot to be construed as limiting the present disclosure.

Moreover, the terms "first" and "second" are used for descriptive purposes only and are not to be construed as indicating or implying a relative importance or implicitly indicating the number of technical features indicated. Thus, features defined by the term "first" or "second" may include at least one of the features, either explicitly or implicitly. In the description of the present disclosure, the meaning of "a plurality of" is at least two, such as two, three, etc., unless specifically defined otherwise.

In the present disclosure, unless explicitly stated and defined otherwise, the terms "mounted", "connected with", "connected", "fixed" and the like shall be understood broadly; for example, it may be either a fixed connection or a detachable connection, or in one piece; it may be a mechanical connection, or it may be an electrical connection or a mutual communication; it may be a direct connection or indirect connection through an intermediate medium, and may be an internal communication of two components or an interaction relationship between two components, unless otherwise expressly defined. It will be apparent to those skilled in the art that the specific meanings of the above terms in the utility model can be understood according to the specific conditions.

In the present disclosure, the first feature being "on" or "under" the second feature may mean that the first feature and the second feature are in a direct contact, or the first and second features may be in an indirect contract through an intermediate medium, unless otherwise explicitly stated and defined. Moreover, the first feature being "at the top of", "above" and "on" the second feature may mean that the first feature is right above or above and to one side of the second feature, or may merely mean that the first feature is horizontally higher than the second feature. The first feature being "at the bottom of", "below" and "under" the second feature may mean that the first feature is below or below and to one side of the second feature, or may merely mean that the first feature is horizontally lower than the second feature.

In the description of the present disclosure, the terms "one embodiment", "some embodiments", "example", "specific example", or "some examples" and the like means specific features, structures, materials or characteristics described in connection with the embodiment or example are included in at least one embodiment or example of the present disclosure. In the present specification, the schematic representation of the above terms is not necessarily directed to the same embodiment or example. Furthermore, the specific features, structures, materials, or characteristics described may be combined in a suitable manner in any one or more embodiments or examples. In addition, those skilled in the art can integrate and combine various embodiments or examples described in the present specification, as well as features of various embodiments or examples, without contradicting each other Although the embodiments of the present disclosure have been shown and described, it would be understood that the above-described embodiments are illustrative and are not to be construed as limiting the scope of the present disclosure. Changes, modifications, substitutions and variations of the above-described embodiments may be made by those skilled in the art within the scope of the present disclosure.

What is claimed is:

1. A servo motor, comprising:
    a housing;
    a rotor arranged in the housing and having a rotor support and a rotor shaft;
    a stator arranged in the housing;
    a Hall magnet arranged on the rotor;
    a printed circuit board arranged in the housing and provided with a position sensor facing the Hall magnet; and
    a planetary reduction mechanism, the planetary reduction mechanism comprising a sun gear, an inner gear ring, a planetary carrier, a motor output shaft, and a plurality of planetary gears meshing with the sun gear and the inner gear ring, the sun gear being coaxially connected with the rotor shaft, planetary shafts of the plurality of the planetary gears being connected with the plurality carrier and the motor output shaft,
    wherein the planetary reduction mechanism further comprises a rotor bearing, the motor output shaft defines a bearing mounting groove, the rotor shaft is provided with a flange, the rotor bearing is fitted over the rotor shaft, an end of the rotor bearing abuts against the flange, and the other end of the rotor bearing abuts against an inner wall of the bearing mounting groove.

2. The servo motor according to claim 1, wherein the Hall magnet is arranged at an end of the rotor shaft facing the position sensor or at a position on the rotor support facing the position sensor.

3. The servo motor according to claim 1, wherein a distance S1 between the Hall magnet and the position sensor is greater than or equal to 1 mm and less than or equal to 3 mm; or
    the printed circuit board is arranged at a rear part in the housing; a minimum distance S2 between the printed circuit board and a rear end cover of the housing is greater than or equal to 4 mm and less than or equal to 8 mm.

4. The servo motor according to claim 1, wherein a surface of the printed circuit board facing the stator and a surface of the printed circuit board away from the stator are each provided with an electronic component, and the position sensor is arranged on the surface of the printed circuit board facing the stator.

5. The servo motor according to claim 4, wherein the electronic component arranged on the surface of the printed circuit board facing the stator generates less heat than the electronic component arranged on the surface of the printed circuit board away from the stator.

6. The servo motor according to claim 1, wherein the rotor shaft and the sun gear are integrally formed; or
    the rotor shaft is detachably connected to the sun gear and the sun gear abuts against the flange.

7. The servo motor according to claim 1, wherein the motor output shaft defines a plurality of fitting holes penetrating therethrough, the plurality of fitting holes are in one-to-one correspondence with the plurality of planetary shafts, and at least part of the planetary shafts protrudes through the fitting holes; or a first end of the motor output shaft is provided with a plurality of fitting grooves, the plurality of fitting grooves are in one-to-one correspondence with the plurality of planetary shafts, and ends of the planetary shafts are fitted in the fitting grooves.

8. The servo motor according to claim 1, wherein a second end of the motor output shaft is provided with a positioning portion, the positioning portion comprises a first positioning portion and a second positioning portion, the first positioning portion and the second positioning portion are spaced apart in a radial direction of the motor output shaft, and the first positioning portion is arranged coaxially with the motor output shaft.

9. The servo motor according to claim 8, wherein the first positioning portion is configured as a positioning groove, and the second positioning portion is configured as a positioning post.

10. A robot, comprising:
a body assembly; and
a leg assembly rotatably connected to the body assembly and comprising:
  a first leg,
  a second leg pivotally connected to the first leg,
  a servo motor, comprising:
    a housing,
    a rotor arranged in the housing and having a rotor support and a rotor shaft,
    a stator arranged in the housing,
    a Hall magnet arranged on the rotor, and
    a printed circuit board arranged in the housing and provided with a position sensor facing the Hall magnet,
  an output flange, and
  a transmission component connected to the output flange and the second leg to drive the second leg to rotate relative to the first leg,
wherein the servo motor is arranged at a first end of the first leg, a motor output shaft of the servo motor is connected to the output flange to drive the output flange to rotate,
wherein the transmission component comprises a connecting rod, a first end of the connecting rod is pivotally connected to the output flange by a first pivot, a second end of the connecting rod is pivotally connected to a first end of the second leg by a second pivot, and a second end of the first leg and the first end of the second leg are pivotally connected by a third pivot wherein the transmission component comprises a connecting rod, a first end of the connecting rod is pivotally connected to the output flange by a first pivot, a second end of the connecting rod is pivotally connected to a first end of the second leg by a second pivot, and a second end of the first leg and the first end of the second leg are pivotally connected by a third pivot.

11. The robot according to claim 10, wherein the output flange is provided with a first limit portion, the first leg is provided with a first stop portion and a second stop portion, and the first stop portion and the second stop portion are spaced apart to limit a rotation angle of the output flange by stopping the first limit portion.

12. The robot according to claim 11, wherein the first leg is provided with a second limit portion configured to limit rotation of the second leg by stopping the second leg.

13. The robot according to claim 12, wherein the output flange is provided with a third limit portion configured to limit rotation of the second leg by stopping the transmission component.

14. The robot according to claim 13, wherein an outer surface of each of the first limit portion, the second limit portion, the third limit portion, the first stop portion, and the second stop portion is covered with a buffer layer.

15. The robot according to claim 11, wherein an angle θ between a first connecting line between the first stop portion and a center of the motor output shaft and a second connecting line between the second stop portion and the center of the motor output shaft is greater than or equal to 110 degrees and less than or equal to 160 degrees.

16. The robot according to claim 11, wherein the transmission component comprises a first pulley, a second pulley, and a transmission belt wound on the first pulley and the second pulley, the first pulley is mounted on the output flange, the second pulley is rotatably mounted on the second end of the first leg, and the first end of the second leg is connected to the second pulley.

17. The robot according to claim 16, wherein the first leg is provided with a second limit portion configured to limit rotation of the second leg by stopping the second leg, and the second limit portion comprises a left second limit portion and a right second limit portion spaced apart along a width direction of the first leg.

* * * * *